US011870754B2

(12) United States Patent
White (10) Patent No.: US 11,870,754 B2
(45) Date of Patent: Jan. 9, 2024

(54) PACKET ANALYSIS AND FILTERING

(71) Applicant: BRITISH TELECOMMUNICATIONS PUBLIC LIMITED COMPANY, London (GB)

(72) Inventor: Catherine White, London (GB)

(73) Assignee: British Telecommunications Public Limited Company, London (GB)

(*) Notice: Subject to any disclaimer, the term of this patent is extended or adjusted under 35 U.S.C. 154(b) by 273 days.

(21) Appl. No.: 17/309,769

(22) PCT Filed: Dec. 18, 2019

(86) PCT No.: PCT/EP2019/085930
§ 371 (c)(1),
(2) Date: Jun. 17, 2021

(87) PCT Pub. No.: WO2020/136052
PCT Pub. Date: Jul. 2, 2020

(65) Prior Publication Data
US 2022/0060448 A1    Feb. 24, 2022

(30) Foreign Application Priority Data
Dec. 24, 2018   (EP) .................................... 18215867

(51) Int. Cl.
*H04L 9/40*   (2022.01)
(52) U.S. Cl.
CPC ...... *H04L 63/0245* (2013.01); *H04L 63/0263* (2013.01); *H04L 63/1458* (2013.01); *H04L 63/20* (2013.01)
(58) Field of Classification Search
CPC ............. H04L 63/0245; H04L 63/0263; H04L 63/1458; H04L 63/20
(Continued)

(56) References Cited

U.S. PATENT DOCUMENTS

| 7,853,689 B2 | 12/2010 | Enderby |
| 10,044,741 B2 | 8/2018 | Vasseur et al. |

(Continued)

FOREIGN PATENT DOCUMENTS

| JP | 2013207675 A | 10/2013 |
| MY | 166071 A | 5/2018 |
| WO | WO-2017020270 A1 | 2/2017 |

OTHER PUBLICATIONS

European Search Report for European Application No. 18215867.5, dated Jul. 3, 2019, 11 pages.
(Continued)

*Primary Examiner* — Teshome Hailu
(74) *Attorney, Agent, or Firm* — Pranger Law PC (57) ABSTRACT

A network device detecting possible malicious traffic and enlists the help of a co-operative group of downstream routers to perform enhanced deep packet analysis and firewalling in parallel with the transport of the packet through the network. The routers may also use other remote computational resource to perform some of the analysis along or close to the route 80 of the packet through the network. The packets are cached at the exit edge router, which does not release the packet from the cooperative group until all analyzers report the traffic is safe, or deletes the traffic if identified as malicious. By buffering at the remote end the packet can be forwarded promptly if approved, but protects downstream components if the traffic is malicious. Routing policies through the network are chosen according to initial estimates of the likelihood that a packet will be permitted to be forwarded from the downstream router, and of the time likely to be taken to reach a decision, allowing cache capacity requirements to be minimized by using higher-latency routes for packets unlikely to be forwarded promptly.

16 Claims, 7 Drawing Sheets

(58) Field of Classification Search
USPC .............................................................. 726/1
See application file for complete search history.

(56) References Cited

U.S. PATENT DOCUMENTS

| | | | |
|---|---|---|---|
| 10,079,718 B1* | 9/2018 | Matthews | H04L 47/125 |
| 11,245,668 B1* | 2/2022 | Rupavatharam | H04L 63/0263 |
| 2005/0108518 A1* | 5/2005 | Pandya | H04L 63/20 713/153 |
| 2006/0136570 A1* | 6/2006 | Pandya | G06F 16/951 709/217 |
| 2006/0136722 A1 | 6/2006 | Ogura et al. | |
| 2006/0161983 A1 | 7/2006 | Cothrell et al. | |
| 2010/0124223 A1* | 5/2010 | Gibbs | H04W 12/12 370/411 |
| 2010/0138920 A1 | 6/2010 | Kim et al. | |
| 2013/0195457 A1 | 8/2013 | Levy et al. | |
| 2016/0072684 A1 | 3/2016 | Manuguri et al. | |
| 2016/0191545 A1 | 6/2016 | Nanda et al. | |
| 2017/0142070 A1 | 5/2017 | Ling et al. | |
| 2018/0103064 A1* | 4/2018 | Ahuja | H04L 63/20 |

OTHER PUBLICATIONS

International Search Report and Written Opinion for Application No. PCT/EP2019/085930, dated Mar. 10, 2020, 15 pages.

Li G., et al., "Deep Packet Inspection Based Application-Aware Traffic Control for Software Defined Networks," GLOBECOM 2016—2016 IEEE Global Communications Conference, Dec. 2016, DOI:10.1109/GLOCOM.2016.7841721, 7 pages.

Search Report dated May 24, 2019 for Great Britain Application No. 1821189.6, 5 page.

* cited by examiner

PACKET ANALYSIS AND FILTERING

PRIORITY CLAIM

The present application is a National Phase entry of PCT Application No. PCT/EP2019/085930, filed Dec. 18, 2019, which claims priority from EP Patent Application No. 18215867.5, filed Dec. 24, 2018, each of which is hereby fully incorporated herein by reference.

TECHNICAL FIELD

This disclosure relates to packet analysis and filtering in a communications network.

BACKGROUND

Data traffic is typically composed of segments which can be individually routed and stored, but which may be part of a larger group. These segments are typically packets or frames, and hereafter they are referred to simply as packets.

Packet filtering is a method of controlling the flow of packets into, or out, of a network based on their content. This can be as simple as looking at the packet flags, or source/destination IP addresses, or it can use deep packet inspection.

Embodiments of this disclosure make use of the principles of deep packet inspection (DPI), which involves detailed analysis of a packet of data, including comparison of the packet contents with a database of known malicious software ("malware"), and analysis of groups of packets from the same source. DPI is used, for example, to identify packets carrying malware such as viruses, worms and Trojan horses, or packets involved in a directed denial of service (DDOS) attack which involves overwhelming a targeted system with a large number of packets, in order that such packets can be filtered to prevent their propagation. However, the technique can be used for any type of data packet or frame filtering, for example identifying packets which carry 'hate speech' or 'fake news', copyright infringements or libelous content. Any such data will be referred to in this specification as "malign".

It is known to forward packets while simultaneously performing DPI in parallel. In these systems, a few packets may have been forwarded before the DPI identifies the traffic stream as malicious and prevents further packets being forwarded. If this is done promptly it can mitigate the effects of a DDOS attack by preventing the majority of the flood of packets from getting through. However, such a system would not be able to guard against other forms of attack, for example if the forwarded packets could have already transmitted a virus into the targeted system.

It is known from Japanese Patent Specification JP2013207675 for provide a relay processing unit for transferring communication to a Web server, in parallel with sending a query to regulation target databases storing a regulation target list almost simultaneously, without waiting for response from one of the databases, and to block downstream communication from the Web server on the basis of a result of the query. However, the filtering is done within the web server, which concentrates the processing at a single point, requires each web server in the system to have complex DPI and other filtering capabilities, and delays forwarding of the data until the inspection has been completed, increasing latency of the connection.

SUMMARY

According to the present disclosure there is provided a method of operating a telecommunications network, in which deep packet inspection is performed on one or more packets,
at a receiving router,
packets are received from a source external to the network
one or more of the packets are identified as requiring deep packet inspection,
indicating data is added to the identified packets,
each packet is forwarded through the network to a downstream router, packets not requiring deep packet inspection being routed with a higher priority than packets requiring deep packet inspection
one or more copies are made of each packet carrying indicating data,
at a downstream router,
for packets that do not have indicating data identifying the packet as requiring deep packet inspection, the downstream router forwards such packets to addresses specified in a packet header
for packets having indicating data identifying the packet as requiring deep packet inspection, the downstream router stores such packets,
at one or more deep packet inspection devices located within the network
the copies are analyzed
the deep packet inspection devices transmit policy updates to the downstream router in response to the results of the analysis, the policy updates carrying instructions on handling packets carrying the indicating data,
at the downstream router
in response to the policy update reports received from the deep packet inspection devices in respect of the indicating data, the downstream router determines whether stored packets carrying the indicating data are to be forwarded to a destination external to the network.

The network can therefore respond to the detection of potentially malicious traffic and enlists computational resources within the network to co-operate to perform enhanced DPI and firewalling. In embodiments of the disclosure, a multiplicity of network devices form a cooperative group which perform the actions of analyzing potentially malicious or unwanted traffic and delivering traffic across the network towards the destination. The computation and analysis may be done in parallel with the transport of the packet across the network. The network comprises one or more caches which are capable of storing packets indexed according to respective values of the indicating data, and in response to the policy updates perform forwarding or deletion actions on the packets. Each router in the network may have a routing table carrying instructions on forward routing caches of packets received over the network, and wherein the routing instructions are dependent on the indicating data carried by the packets. The downstream router, and any intermediate routers on a routing path determined by the routing instructions, can be configurable to modify the routing table relating to packets carrying the indicating data in response to a policy update transmitted by the deep packet inspection devices. The routes and priorities of packets in the routing tables may be adjusted according to an initial estimate of a value to allow prioritization of handling of some types of malign packet over others—this value will be referred to herein as its "malignity". A packet identified as benign would have a malignity value of zero.

Packets may be identified as belonging to groups, and in each group deep packet inspection of sample packets from the group can be used to represent all packets in the group, and are allocated a common indicating data tag. Sample packets from the group can be anaylzed, and other packets in the group stored awaiting results of the analysis, and when the analysis of the sample packets is complete all packets having the common indicating data tag are forwarded or deleted in response to the resulting policy update.

In one embodiment, each packet is transported towards the destination, but is not released from the downstream router until a policy update indicative that the packet is not malign is received from the deep packet inspection devices. A stored packet may be deleted if a report is not received relating to the packet within a predetermined time.

Analysis may be performed by a computing resource associated with the receiving router, or by a plurality of computing resources in the network. In the latter case, each packet may be analyzed by a respective member of the plurality of computing resources, or each packet may be analyzed by a plurality of computing resources, each resource performing a respective test on the packets and transmitting a report to the downstream router. The computing resources that are to perform the analysis are selected according to available processing compatibility, and to be on, or as close as possible to, a path taken through the network by the packet from the receiving router to the downstream router.

Reports of the results of analysis may be transmitted over a communications connection separate from the connections carrying the packets, having a minimum-latency path.

The disclosure also embraces a router for a telecommunications network, configured to operate as a receiving router in the method of any preceding claim, having means to receive packets from a source external to the network, means to identify packets that require deep packet inspection, means to add indicating data to packets so identified, and means to forward packets through the network o a downstream router and to one or more deep packet inspection devices within the network. The router can have packet copying means to allow separate copies of a packet to be sent to a deep packet inspection device and to the downstream router, and packet allocation means for selecting computing resources within the network to perform deep packet analysis, and transmitting instructions to the selected resources to perform the analysis. To allow such selection, it may also have a receiver for receiving and processing data from the computing resources conveying information about their computing capabilities.

The disclosure also embraces a router for a telecommunications network, having a receiving means for receiving packets from another router in the network, detection means for identifying packets carrying indicating data inserted by a receiving router at an upstream node in the network, a buffer store for storing packets carrying the indicating data, means for receiving and processing reports from computing resources within the network relating to the buffered packets, and for deleting or forwarding the buffered packets in accordance with the reports. The router may have means for receiving and collating multiple reports from a plurality of computing resources within the network relating to each packet, and may have a routing table carrying instructions for forwarding data packets to further routers, and having means for receiving data instructions from a control system for modifying the routing table in respect of packets carrying specified indicating data.

It will be understood that any given router may incorporate both functionalities, so that it can operate both as a receiving router and an edge router for different traffic streams.

The computational resources may be incorporated in one or more routers on the path taken by the packets, and the routing of the packets through the network may be selected to go by way of routers which have appropriate computational resources. However, other computational resources, remote from the packets' path through the network, may also be used to perform some of the analysis. The computation and analysis can be done in parallel with the transport of the packet through the network, which can be buffered or cached within the network, and not released from the cooperative group until all analysis is finished and all analyzers report the traffic is safe. In some embodiments, any buffering or caching required is done at a point close to the exit edge router, to minimize delay once a packet, or group of packets, have been reported as safe.

By having multiple devices working in concert, rather than having a single device at a border which performs deep packet inspection and then makes a decision about whether to release the packet, lower latency in delivery of packets can be attained. This advantage is achieved because messages may be transmitted 'downstream' i.e. towards the intended destination or exit router, whilst a copy of the packet is simultaneously sent to computing resources for more intensive analysis. Further efficiencies are possible in this configuration by distributing analysis over the available computational power in the network, because rather than each entry (receiving) node only being able to use computational power close to that node, it is also able to draw on computational resources elsewhere in the network, for example close to other nodes not currently carrying as much suspect traffic.

Embodiments of the disclosure also allow a reduction in overall computing resources, as specialist applications need only be installed at a limited number of nodes, to be accessed as required to assess any packet stream passing through the network.

In embodiments of the disclosure, control messages are used to carry information from one or more DPI analyzing units to other network devices within the cooperative group in order to modify packet flow, storage and deletion. A separate path may be identified within the network, or provisioned separately, for the transport of these control messages. Such a path can be optimized for low latency (high speed), but low capacity so that the control messages can be directed promptly to nodes at which the suspect packets are buffered or cached, to allow them to be authorized promptly for appropriate action (forwarding, deleting, etc.). In some cases all packets may be subject to DPI, but in others packets initially identified as potentially damaging (hereinafter referred to as "suspicious" packets) may be marked for further investigation before release.

The network nodes are configured so that packets marked as requiring analysis are not released to a section of the network outside the DPIDA cooperative group until further control instructions are received. The packets are therefore not released from the cooperative group until analysis is complete. However in some cases packets may be forwarded across a section of network out of the control of the DPIDA group, in order to reach another section of the DPIDA group. In these cases, packet encapsulation may be used so that the intermediate, uncontrolled network interprets the receiving member on the next segment of DPIDA group as the packet destination.

An initial estimate of confidence in the traffic may be made after it arrives onto the cooperative network. According to the level of confidence, the traffic may be allocated to a lower latency or higher latency route through the cooperative group towards its destination. This may comprise making an estimate of the latency of a plurality of routes through the cooperative group. This estimate may be made on the basis of information held by a network controller, or by transmitting test packets through the plurality of routers and measuring the transit time of the test packets. Embodiments of the disclosure may deliberately increase latency by forwarding packets with low confidence values for trustworthiness to a packet cache close to the destination, in order to prevent network congestion, while minimizing latency for traffic with high confidence of trustworthiness. The use of a cache close to the destination minimises latency for traffic which is initially suspect, but which later proves to be healthy, as the packets can be promptly retrieved from the cache after analysis. To avoid overloading buffer stores near the forwarding node, the packet stream may be routed over a path selected to have a latency similar to the time likely to be taken for analysis.

Once a suspicious packet has been identified, further packets having the same address data, or otherwise associated with the suspicious packet, need not all be analyzed, but may be flagged to await the outcome of analysis of the suspicious packet before a decision is made as to whether they too should be forwarded or deleted.

The DPI process can involve assembling information out of a sequence of packets to aid in classification of packets to a group and assessment of malignity. In one example, an initial suspicion that a packet stream comprises "hate mail" may be confirmed or refuted by analysis of subsequent packets in the stream. In another example, a single packet originating from a source known to have originated DDOS attacks in the past may be a precursor of a new attack, but only analysis of further packets can confirm this.

In order that control of the packets as they flow through the network can be achieved, a strategy is needed for passing control messages between the analyzing component performing the decision making and the network devices where the packet is currently held or in transit. In one embodiment, analyzing units simply broadcast control instructions to all other network devices in the cooperative group. In another embodiment packet caches and other network devices may look up the instructions periodically from a server containing decisions made by the analyzing component, and in this case need only look up instructions for packets marked with tags that the network device has seen or controlled.

A packet may remain in transit and never have to be sent to a packet cache, as the control message to forward towards the destination (release the packet from the cooperative group) may overtake the packet via the low latency route.

Alternatively, if the packet reaches the network device (typically router) closest to the destination but no instruction has yet been received by that device whether to release the packet to the external destination or to drop it, then the network device may identify the closest packet cache in the network which has availability and forward the packet to this packet cache.

The packet cache may notify the control plane about each new group tag of packets that it receives. It is not necessary that every packet of a given type (with the same combination of group tags) is stored in the same packet cache.

An initial estimate of the trustworthiness of the received traffic (typically packet) can be made by a computing DPI analysis network element. This can be used to plan the initial route by the receiving router, or to set a general policy for all individual downstream routers such as 'forward packets of this type by a direct route' or, for traffic about which there is less confidence and for which longer processing time will be needed, 'forward packets of this type by less congested but longer route if one is available'.

Planning the routes for the packets to be sent in the network can also involve selecting different routes depending on factors which include the anticipated time it will take to decide whether the packet is part of a malicious or unwanted traffic stream. These embodiments may comprise determining a score for each packet, the score including a term indicative of the estimated level of trust, and a further term indicative of the estimated time it will take to decide whether the packet is part of a malicious or unwanted packet stream.

Embodiments using low latency paths (which only require a low bandwidth) include the use of lower latency and more direct media, such as medium or long wave radio or low latency optical fiber such as hollow core fiber. However low latency paths can also be constructed by allocating different channels over the same infrastructure (for example allocating one channel of a DWDM network for control, and minimizing buffering and delays on the processing of data on this channel.)

The method of selecting a route may involve ranking the possible routes according to estimated latency. The method may further comprise selecting a route using a probability-based approach. The probability of selecting a lower latency route may be proportional to the level of trust in the packet. This approach has the advantage of being less prone to get into states for which there are no solutions, or only bad solutions.

The network devices may store control policy instructions which are sent to them from the control plane or directly from the computational analysis components. These include policies to either drop packets with a certain tag or combination of tags, or to forward packets to a location, which may be amended or determined by the policy itself, or may simply be a policy to forward packets to the default location stored in the network device's routing table.

Control messages can cause packets to be released (forwarded) or simply dropped (deleted) from the packet caches on demand, for example according to a group tag or combination of tags.

Therefore each network device may contain a memory in which policies are stored, and these policies may also be updated and deleted by instructions from the control plane or direct from a computing/analysis decision making unit.

It is desirable that packets are stored within the network as close to the downstream network edge as possible. By buffering at the remote end, rather than at each analyzer in turn, the packet can be forwarded promptly once they have been approved. If one or more analyzers report the traffic as malicious, the packets can be deleted from the buffer without forwarding, thus protecting downstream components. However, standard routers and switches do not have a great deal of buffering capability and may operate as a FIFO (first in, first out) for packets, which would be unsuitable if some packets are approved promptly, before other packets which have been in the buffer for longer. Storing packets in the standard buffers of critical network routers and switches would cause network congestion. Therefore a strategy can be employed which allows for storage of packets elsewhere, until the analysis is complete, without causing network congestion. This strategy includes calculating longer latency (but not excessively long) routes to transport packets which are initially estimated to require a longer time to analyze whether the network should deliver them or delete them. The strategy can also include provisioning caching points for packets within the network, such that for traffic which requires a longer analysis time, those packets can be directed to caching points as near as possible to the edge of the cooperative group which provides an optimum route to the destination external to the network. These packet caches can have a look-up structure, such that packets can be retrieved by their group tag or ID. Typically, if an analysis finished and classified a packet or group of packets as malicious, it would send an instruction to the packet cache to drop all packets in that group.

In embodiments where only sample packets are analyzed, other packets in the same stream may be marked to indicate that they should also be buffered until the sample packet is analyzed, to be released or deleted with the sample packet as appropriate.

It is also possible for a packet to be analyzed in the context of subsequent packets, e.g. from the same source, with less delay. In one such example, a rule could be constructed such that a packet may be released at the downstream edge router if no other packets from the same source have been received at the entry-point router in the time that it takes for the packet to reach the edge router, thus negating an original suspicion that the packet may have been the precursor of a systematic attack such as a DDOS attack or an automated flooding of the network with similar messages.

The suspicious packets may be sent to a single, remote central resource, or to distributed resources, for deep packet inspection. The analysis of the packets may be divided into tasks which may be performed, wholly or in part, by different computational resources. In some implementations, the different tasks involved in deep packet inspection may be performed by successive routers as the packet passes through them; with the final router waiting for the response from all of the routers through which the packet has passed, and which have performed analysis on it, before releasing the packet to a point outside the cooperative group.

Computational resources may include local computation on network devices which dynamically advertise that they have spare local computational resource. It is preferable in some embodiments that the resources selected to perform the computation are distributed on, or as close as possible to, the route of the packet through the network, in order to minimize any signaling overhead required by calling for analysis capability from processors topologically further from the route. The purpose of this design is so that the packet requires minimal duplication outside of the path that it would normally take through the network. These resources may be allocated using a fixed plan, but in some implementations, the process may involve the calculation of a set of computational resources which is as close as possible to the local computational resources along the actual route taken by the packet, but can provide sufficient resource for the all the DPI tasks to be completed.

BRIEF DESCRIPTION OF THE DRAWINGS

An embodiment of the disclosure will be described with reference to the drawings, in which.

DETAILED DESCRIPTION

Figure 1:
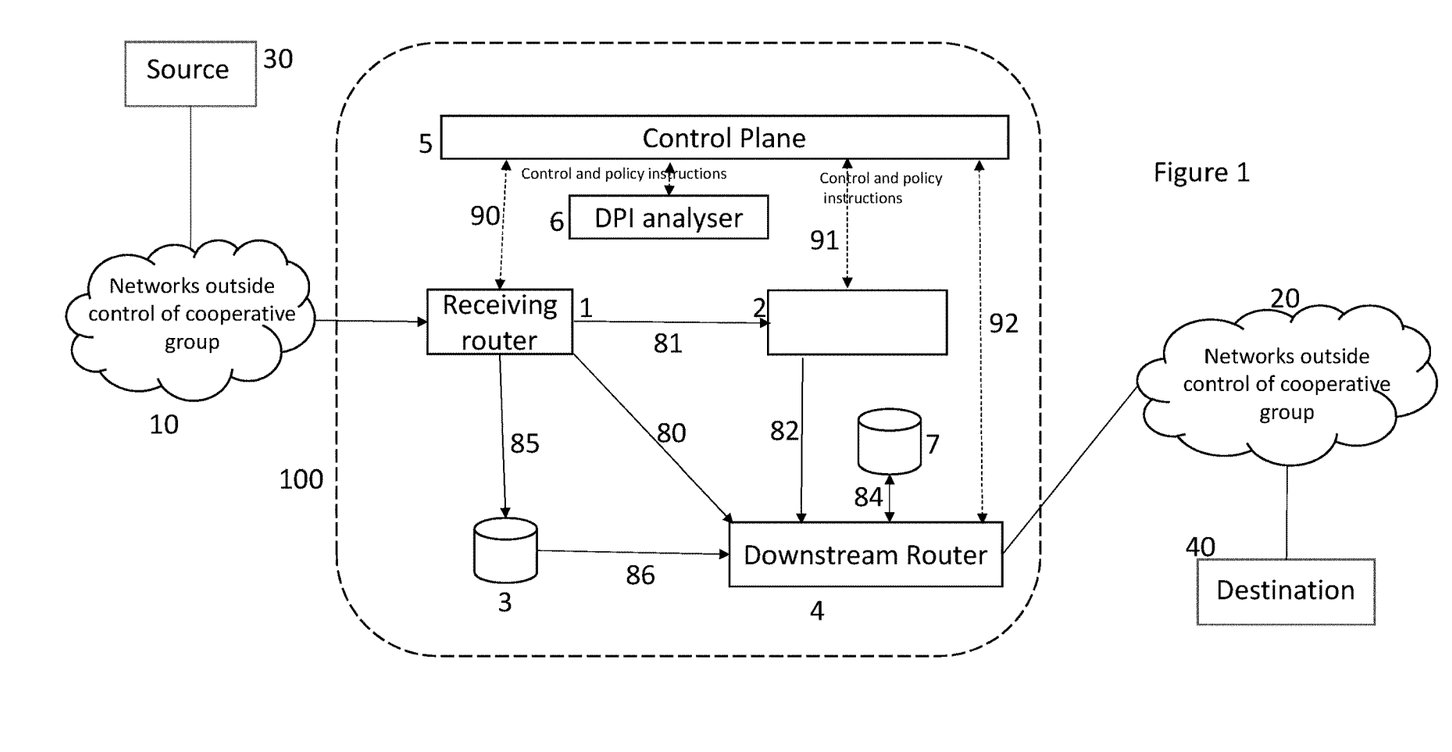
FIG. 1 depicts a co-operating group of routers which may operate in accordance with a first embodiment of the disclosure.

FIG. 1 depicts a group 100 of network devices 1, 2, 3, 4, 5, 6, 7 that cooperate together to mark, monitor and release packets, referred to herein as a 'cooperative group'. This is a simplified picture, there would typically be a larger number of routers and other network devices in the cooperative group. Buffer stores 3, 7 are incorporated in the network at which data packets can be cached whilst the packets are analyzed. Data links 80, 81, 82, 84, 85, 86 are provided between the nodes.

In this embodiment, the cooperative group 100 corresponds to an autonomous network; and the boundaries may correspond to border gateways 1, 4 between that network 100 and other autonomous networks 10, 20. In other implementations, they may correspond to boundaries with the access network.

A control plane 5 co-ordinates operation of the network, with control connections 90, 91, 92 to the respective routers 1, 2, 4, and provides an interface with a DPI analyzer 6. In some embodiments, DPI analysis may be distributed over a number of locations within the network. Separate infrastructure may be provisioned for the low latency control channels. For example, point-to-point, long-wavelength radio communications provide high range and low latency communications suitable for transmitting low bandwidth control signals with minimal delay, to the various nodes in an extended wired or optical network. Similarly, low latency optical fiber such as hollow core fiber may be used to carry these channels. Another aspect of the low latency control channels may be that they are forwarded across the network without significant caching.

Some or all of the network devices 1, 2, 3, 7 have the ability to mark packets for further identification, either at individual packet level, or more usually as a member of a packet group. The method which the packets are marked can be by encapsulation into larger packets or frames used for coordination within the cooperative group: the packet would then be de-encapsulated by the downstream router 4 into normal form before leaving the network formed by the cooperative group 100 and being passed towards its destination 40. Alternatively, in some embodiments the packet may simply set bits or flags in a free part of the packet header or an unused space within the frame. The control plane 5 can transmit instructions to the various network elements 1, 2, 3, 4, 7 to perform an operation on all packets carrying the same marking. This allows all packets in such a group to be released from a cache, forwarded, deleted, or have their priority modified in response to completion of analysis of a sample of one or more packets from the group.

Figure 2:
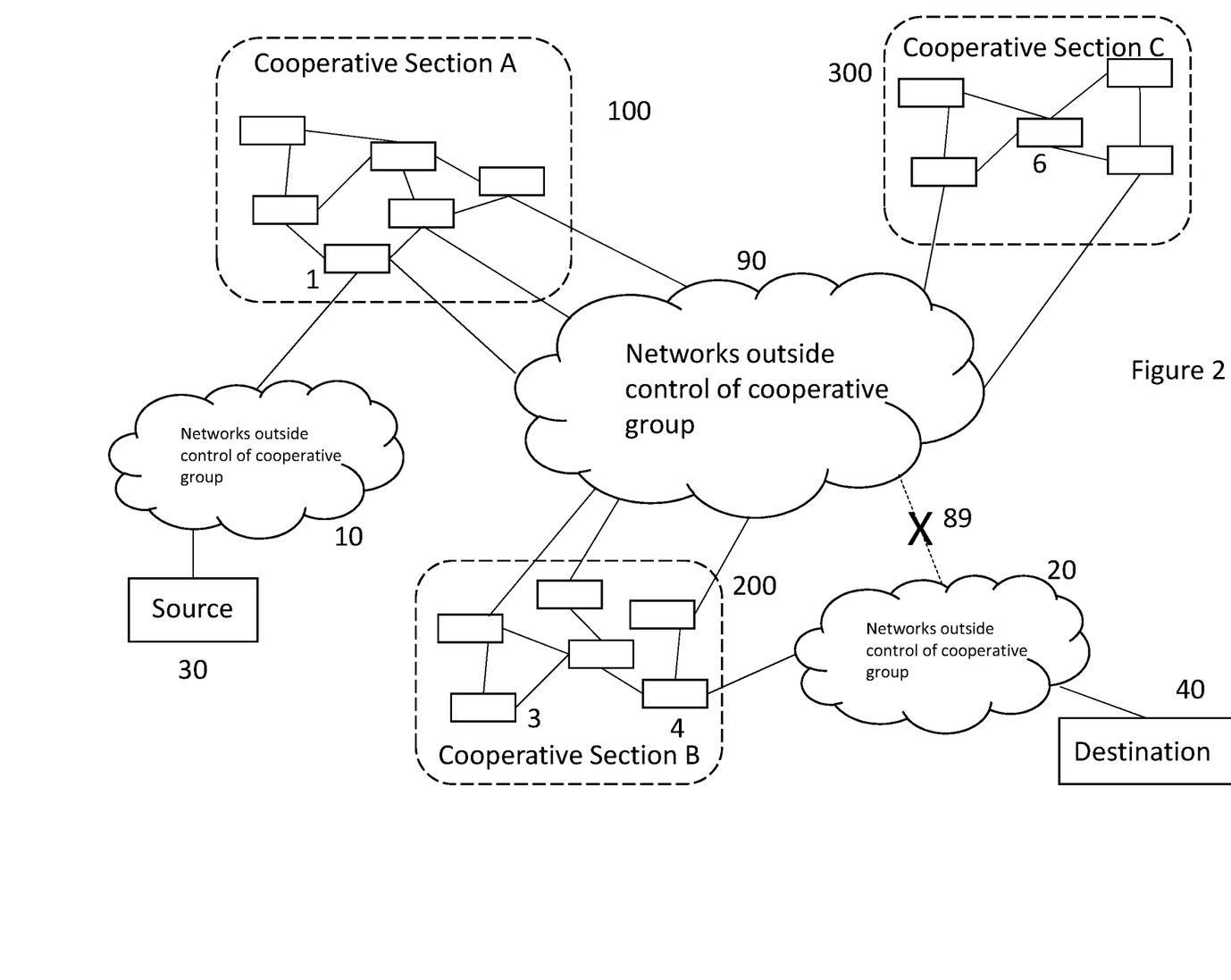
FIG. 2 depicts a distributed co-operating group of routers, in a second embodiment of the disclosure.

In a variant of the embodiment of FIG. 1, a plurality of co-operative sections 100, 200, 300 may be interconnected by network elements 90 not forming part of the group. Routing of packets and control messages may pass between the co-operative elements using the uncontrolled part of the network, and provided the suspect packets are suitably flagged the co-operative sections will not allow suspect packets to be forwarded to their target destination 40 until the required control message is received at the downstream router 4. Analysis may be performed by computational elements 6 in a co-operative section 300 which is off-route from the path taken by the packets themselves between the receiving and downstream routers 1, 4. Such an arrangement requires that the data packets are routed through the other network elements 90 with addressing such that they are routed to a downstream router 4 forming part of the co-operative network 100, 200, 300, or to a designated cache 3, to avoid a direct route 89 being taken between the uncontrolled elements and the destination 40

Two examples of operation of a packet stream being sent from an example source 30 to an example destination 40 will be described.

In the first example, a packet is received from the source 30 at the receiving router 1, and an initial assessment is made.

When the packet is received onto the network, an initial assessment of the packet is performed. The initial assessment may be performed at the receiving router 1, or it may be referred to a separate analyzing computational resource 2. In the second case, the receiving router may have a default address of one or more computational resources to perform the initial assessment; or the receiving router may make a request to the control plane 5 for the address of an analyzing unit to use for initial assessment. In some embodiments the receiving router 1 may first compare the packet source and flags against a simple whitelist or blacklist (as is already normal practice), and if it is found in neither, may then forward a copy of the packet for initial assessment.

The initial assessment on the packet may return a numerical metric or class indicating the likelihood that it is valid (benign), or alternatively a metric indicating the likelihood of the converse, that it is malign. If the likelihood that it is benign is determined to be a certainty the packet can be immediately forwarded to the downstream router 4. Likewise, if the likelihood that it is benign is zero (100% certain that it is malign) it can be deleted without further analysis.

The initial assessment may also include a metric expressing an estimate of how much time it will take the DPI analyzing system to make a final decision on whether the packet should be deleted or forwarded to its final destination. Normally this will consist of an estimated time in milliseconds that it will take to reach a final decision, from the time of the initial assessment being delivered to the receiving router.

Thirdly the initial assessment may optionally include metrics expressing confidence in each of the previous metrics, in particular providing a confidence value in the timeframe estimated to be sufficient to assess whether the packet is benign.

The route that the packet will take is planned based on the initial assessment. Packets which are likely to be benign and are likely to be confirmed benign/valid within a short time are given the highest priority over good routes.

At the point of being received onto the network, the most suitable downstream edge router 4 is identified, either by the receiving router 1 itself or by referring to computational resources in the control plane 5. The control plane 5 provides a suggested target downstream router 4 close to the destination 40, and a set of possible candidate paths 80, 81/82, 81/83/84, 85/86 towards the destination 40.

The downstream router 4 will normally be the router 4 within the cooperative network 100 which is closest to the destination 40 of the packet in routing terms. In other words, the suitable target downstream edge router 4 for the packet will be that which contain instructions in its default routing tables which correspond to forwarding packets with the destination IP address 40 to a location external to the cooperative network 100. In a complex network there may be more than one such router, and the routing logic within the network will direct packets to whichever has the most efficient routing within the network 100.

The metrics in the initial assessment are used to prioritize traffic. This prioritization will both change the order in which the router 1 processes the traffic, and, in order to minimize network congestion, will change the route assigned to the packets. A suitable prioritization strategy is to prioritize first by probability that the packet is benign, then within that category by the likely time to final decision, and then within that category by overall confidence in the initial assessment. A simplified prioritization strategy (based on three levels of benignity and two estimated assessment times (but not taking confidence levels into account) is depicted in the Table below. It will be understood that a larger range of classes or numerical values for each attribute of the initial estimate may be used, but the principle will be unchanged.

Prioritization in this order ensures that traffic which is likely to be benign arrives at the downstream router 4 promptly and can be forwarded with minimum delay, whilst traffic less likely to be found to be benign is still passing through the network, and is not occupying cache space, whilst the expected instruction to delete it is generated. Packets on which a decision is likely to require a lot of processing time are also de-prioritized to better synchronize their arrival at the downstream router with the decision.

| Initial Estimate | | |
| --- | --- | --- |
| Malignity of traffic | Time to final decision | Priority |
| Low (benign) | Fast | 1 |
| Low (Benign) | Slow | 2 |
| Medium | Fast | 3 |
| Medium | Slow | 4 |
| High | Fast | 5 |
| High | Slow | 6 |

According to the priority of the traffic and the network topology and congestion, a route is selected. Firstly, the shortest path 80 across the cooperating group 100 to the downstream edge router 4 is identified (by the control plane 5 or by the receiving router 1). Methods are well known in the field. For example, by Djikstras algorithm a shortest path can be found, and other secondary candidates can be found by the well-known k-simple paths algorithm.

Then, if the estimated time to traverse the identified shortest path 80 is longer than the initial estimate of time to the final decision, and the shortest path exceeds a threshold for congestion along all or part of its links, and a secondary candidate 81, 82 exists with lower congestion, but which has a time not exceeding, or only slightly exceeding, the estimated time to a final decision, then the secondary candidate route 81, 82 is selected instead.

Figure 3:
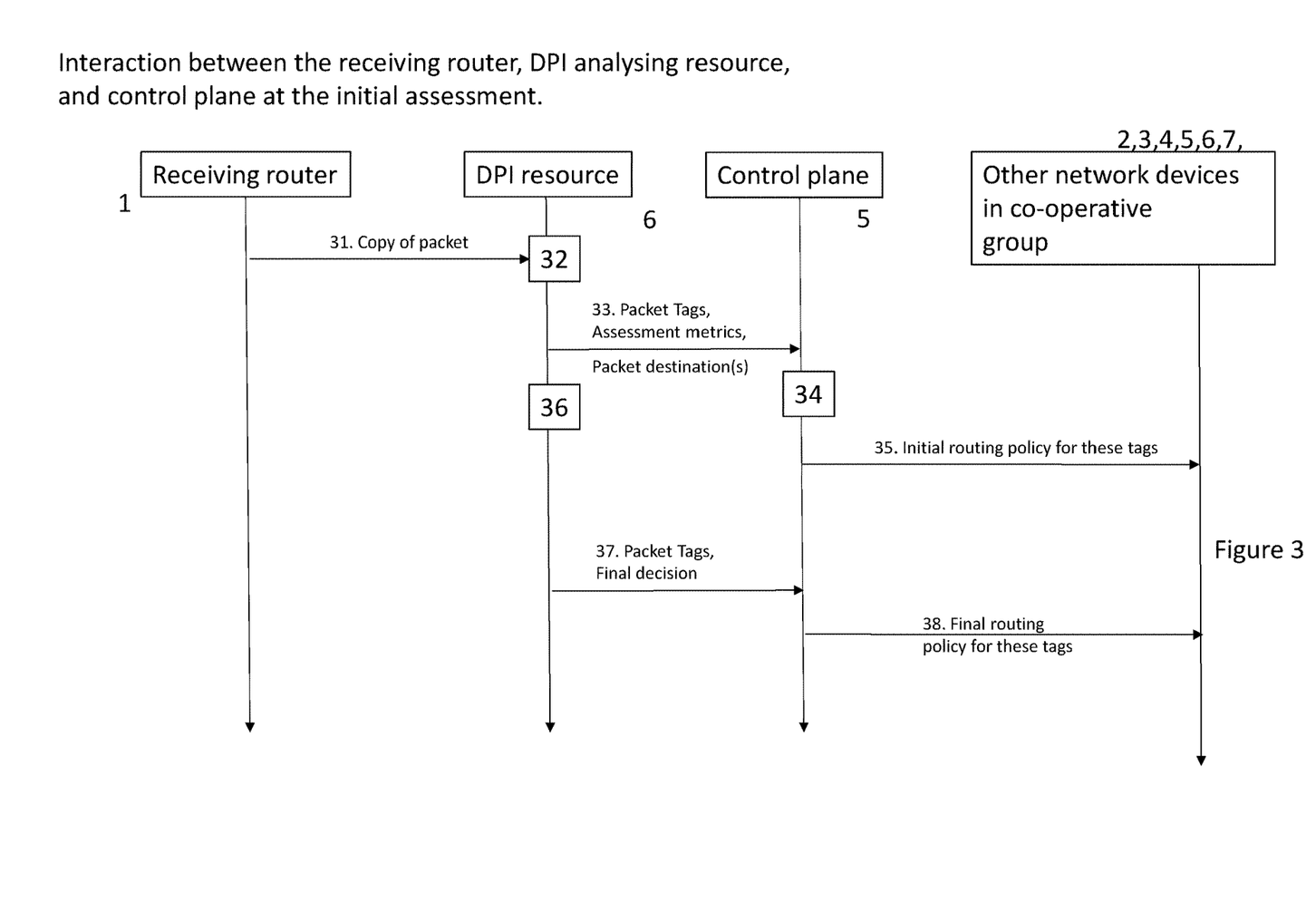
FIG. 3 is a sequence diagram depicting interactions between elements of the network performing a process according to an embodiment of the disclosure.

FIG. 3 is a sequence diagram showing an example of interaction between the receiving router 1, DPI analyzing resource 6, and control plane 5 from the initial assessment to the final decision. It should be noted that this is a broad overview of communication, and that a real world embodiment may include more detailed handshaking and authentication between network components, as would be apparent to one skilled in the art.

The receiving router 1 sends a copy of a packet or (for efficiency) a block of packets to the DPI resource 6 (31). The receiving router may also store a copy of the packet until receiving further notification from the control plane 5 to forward it towards the destination 4, 40. Alternatively, the receiving router may forward the packet immediately, based on a default routing strategy.

The DPI resource 6 classifies each of the received packet(s) by a category which may be a combination of one or more tags, and generates an initial assessment which may include an initial estimate of likelihood the packet is malign, an estimated time to final decision and an estimated confidence (32). The DPI resource may also store the packet copies, so that it can perform an analysis across newly-received and historical packets.

The DPI resource 6 sends to the control plane 5 the initial assessment of all packets identified by a category, together with an update of packet destinations that correspond to this category (33). (Initially, this is the destination IP address(es) 40 of the packet or packets in this category, but updates may direct it to a cache 3, 7, or to specialized analysis function.)

The control plane 5 uses the destination(s) 40 corresponding to each packet category to calculate one or more downstream routers 40 and candidate paths 80; 81, 82; 81, 7, 84; 85, 3, 86, from the receiving router 1 to the target downstream router 4 (34). It calculates the estimated time to transport packets by the candidate pathways, and the estimated time to send updates to the target downstream router by a low latency path 92. It uses information about the congestion status of the network (reported by other network devices), the initial assessment for the packet category, and the estimated times to select the best route(s) for the packets in these categories.

The control plane 5 next sends updated routing policy information via low latency control paths 90, 91, 92 to the network devices 1, 2, 4 (35). The routing policy information may be forwarded to all devices on the network, or alternatively only those anticipated by the control plane to see the group of packets to which the policy applies. This will include the receiving router 1, and in the case of the receiving router the policy forwarded will include an instruction to release and forward to a next destination.

If the packet is identified as benign, it may notify the receiving router 4 to release and forward the packet. As described above, packets which arrive at the downstream router 4 before a control message is received from the control plane 5 over the control link 92 may be forwarded as soon as they are received, in circumstances in which the packet will necessarily have been subject to controls at an intermediate point 3, 7 before reaching the downstream router 4, or where it is assessed that no damage will be caused to the external networks or destination if the first few suspect packets get through, for example in the case of a DDOS attack, which relies on swamping the network with packets.

In parallel with these activities, as more packets are received the DPI analyzer 6 continues to assess packets with more detailed analysis (36), until it is able to reach a final decision for the packet category, and communicates this to the control plane 5 (37). The control plane 5 translates the final decision into a routing policy for this packet category, and communicates this to network devices 2, 3, 4, 5, 6, 7 in the cooperative group (38).

A number of examples of routings will be described, with reference again to FIG. 1. In the first example, a route 80 is taken by packet stream which has been initially assessed as probably benign, and that this can be confirmed in a time as short as, or shorter than, the time to travel by the shortest path 80 to the target downstream router 4.

However if the control plane has received reports of congestion from routers along this path, then packet streams which are assessed to require longer time for analysis, are sent via a longer and less congested route 81, 82.

The routes are set up by the control plane 5 (35, FIG. 3), which instructs all routers which are part of the route corresponding to a given class of traffic (identified by a tag or combination of tags) to update their routing tables to forward packets with this tag to the next router in the intended route. The target destination router 4 is given the default instruction to store the packet (if it has that function) or more likely to forward the traffic to a packet cache 7. The routers involved in the initial planned route are also given an instruction to subscribe to updates to this route transmitted from the control plane 5. Updates 37 can be used to modify the routing tables if the routing is to be changed. An update 37 may also be used to instruct each router to delete any further packet it receives having the specified tag.

In the second example, a packet stream is sent to a packet cache 7 to prevent network congestion at the downstream edge router 4, because the projected initial estimate of analysis time is longer than the time that the packet will take to travel through the network by any of the sensible (uncongested) path candidates. The packet cache 7 is needed to prevent buffer congestion at the target downstream router 4. The shortest path which is not congested will normally be selected be used for traffic destined to a packet cache.

Other considerations such as QoS flags for priority may also be considered as factors in the packet routing and prioritization algorithm. However, in most embodiments conventional QoS flags would be a secondary consideration, such that if there two packets with the same initial assessment metric value for 'malignity' and 'time to final decision', then the packet with the higher priority QoS flag will be prioritized in the router for forwarding, and, if there is congestion in the network which prevents all packets being assigned to the best routes, be assigned to the better route. However, if the packet has a higher QoS flag but a longer estimated time to final decision which is longer than the estimated time to travel the best route in the network, then it will be forwarded through a less congested but longer route if necessary.

In the embodiment of FIGS. 1-3, suspicious packets identified by the receiving gateway router 1 are all sent to a single, central resource 6 for deep packet inspection. However, the control plane 5 may have a number of distributed analysis functions, with copies of each packet sent to one or more such resources for analysis. The control plane may also determine that a number of packets having similar characteristics should all have the same flag, but that it is only necessary to analyze one, or a small sample of such packets, the outcome of that analysis then resulting in a control message to the network elements either to forward or delete all packets with that flag value in accordance with the results of that analysis.

Figure 4:
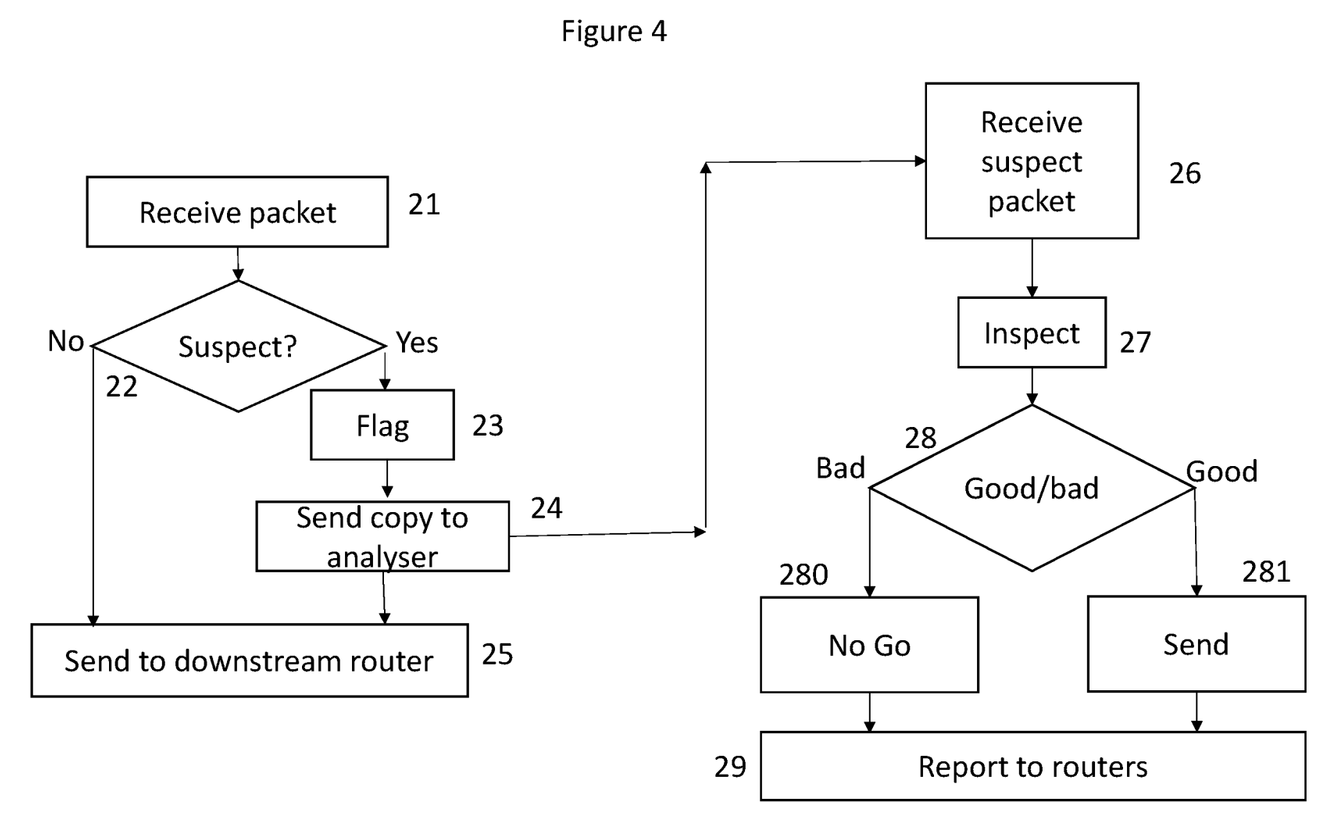
FIG. 4 is a flow diagram depicting a process performed by a receiving gateway router and analysis processor of the embodiment of FIG. 1.

FIG. 4 depicts the operation of the receiving gateway router 1 and the analysis processor 6 of the embodiment of FIG. 1.

Referring to FIG. 4, when a. packet is received by a router 1 in the DPIDA group 100 from an outside source (21), a rule knowledge bank is checked to decide whether the packet is suspect (22). If, based on that check, it decides that the packet is suspect, it marks the packet for DPIDA (23). This initial task may be performed by the router 1 itself, or by a centralized analysis function 9 communicating with the receiving node over a control link 90. Copies of the flagged packets are then sent to the computational resources 9 that will do further DPI (24).

The receiving router also sends all packets, whether flagged or not, onwards on their route within the DPIDA network (25). Other routers 2 in the DPIDA group forward the packets on towards the last router 4 in the DPIDA group. The routers are arranged to check, in the case of flagged packets, to ensure they are not forwarding outside the DPIDA group, and that therefore they are not the 'downstream edge router'.

On receiving its copy of the packet (26), the analyzer 9 performs deep packet analysis (27) on the packet. When it has determined whether the packet is safe (28) it generates an appropriate control instruction (280/281), and the results of that inspection are reported to routers on the current and any modified route, and in particular to the downstream gateway router 7 (29) in the form of amended flag values and/or routing instructions, using the low latency control channels 90, 91, 92, which are designed to use minimal buffering and shortest path algorithms for routing.

Figure 5:
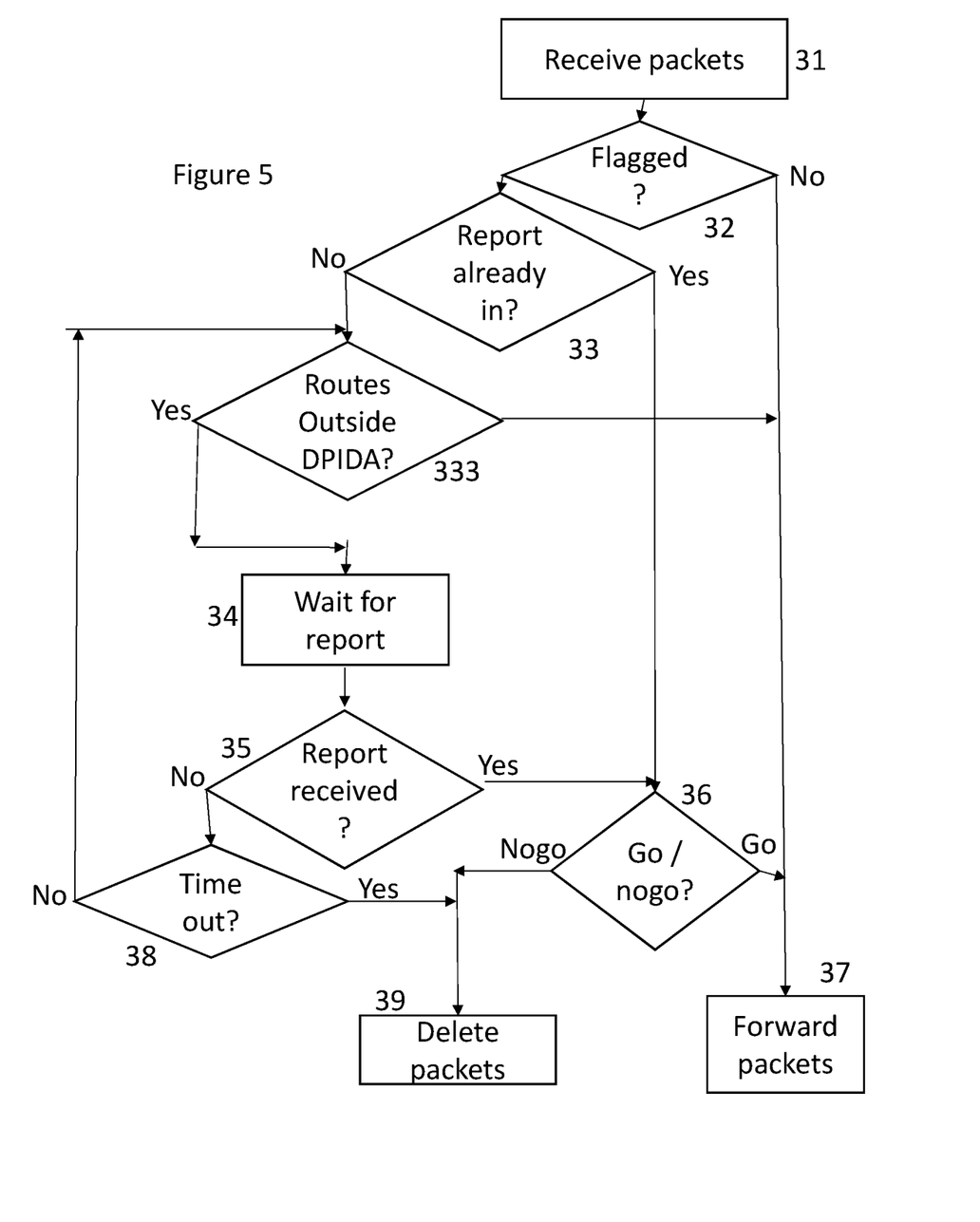
FIG. 5 illustrates a process performed by a router and associated cache further downstream in the embodiment of FIG. 1.

FIG. 5 illustrates the processes performed by a router 2, 4 further downstream in the embodiment of FIG. 1. The operation of the downstream router 4 is similar to that of the intermediate routers (e.g., 2) in most respects, As shown in FIG. 5, a packet arrives at a router 2, 4 (31) which checks whether the packet has a flag (32) or DPIDA shim. Unflagged packets are forwarded according to the router's standard routing table (37).

If the packet is flagged, the router checks whether it has been sent a rule from the DPI analyzer 6 modifying its routing table (33). If it has not yet received such a rule, the router checks whether its default routing would forward the packet outside the DPIDA group (333) (i.e., the router is the downstream edge router 4 for this packet stream), and if so, it holds the packets in its local cache 7 (34).

If the router is not the downstream edge router 4 (that is to say, the next step in its default routing table is another member of the DPIDA group) the router uses its standard routing table settings to forward to the next router in the standard table (37). This ensures that packets are cached as close as possible to the downstream router 4, to reduce delays if and when the packets are cleared for release outside the DPIDA group.

The downstream edge router detects the shim or bits set by the DPIDA receiving router 1, and unless it has already received a control message (33), it stores the packet in a cache 7 (34) until it has received a control message from the control plane 5 (35) either that the stream is safe to forward beyond the network 100, or that the stream is not safe. Based on the control message, the downstream router 7 decides what to do with the packet (36).

The decision may be to forward the packet to a destination beyond the DPIDA group. (37). If the packet is cleared for release, then the downstream edge router removes any shims or flags that were used within the group to mark this packet as being subject to a DPI process and not ready for release outside the group, and forwards it to a destination beyond the DPIDA group.

If a control message is received requiring that the packet be dropped (36) or if no report is received before the system passes a timeout threshold 38, the packet is deleted (39).

Figure 6:
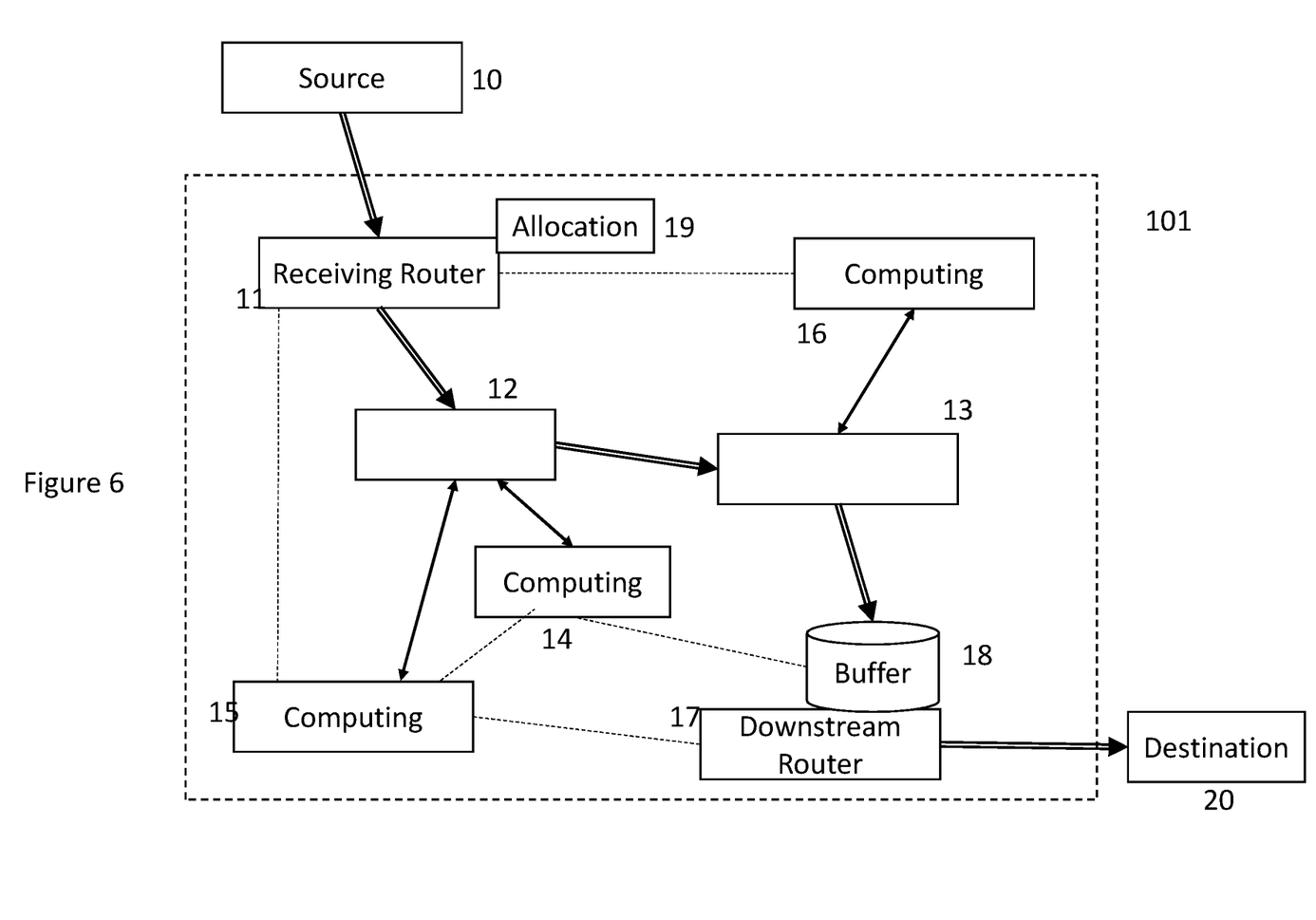
FIG. 6 depicts another embodiment of a co-operating group of routers.
Figure 7:
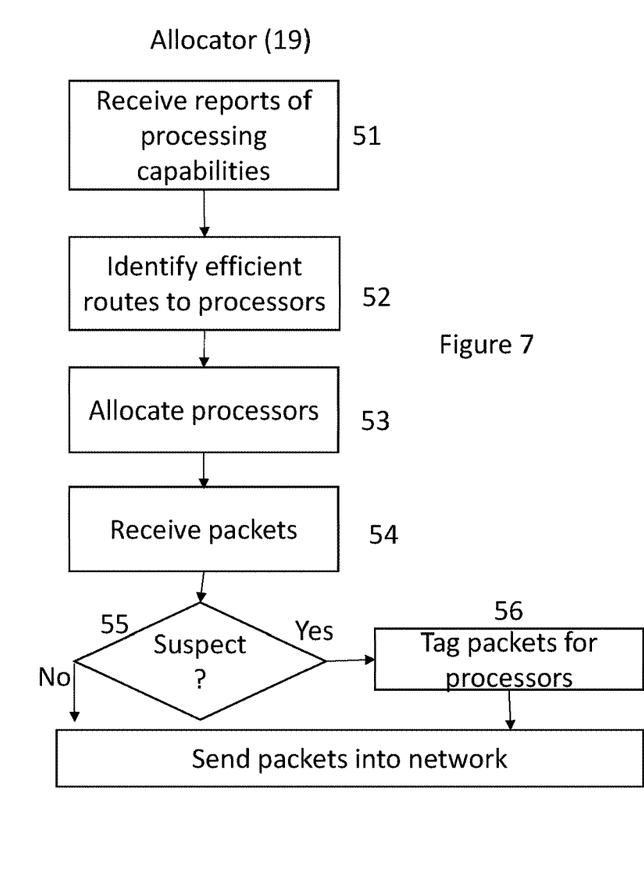
FIG. 7 depicts a flow diagram of the embodiment of FIG. 6.
Figure 8:
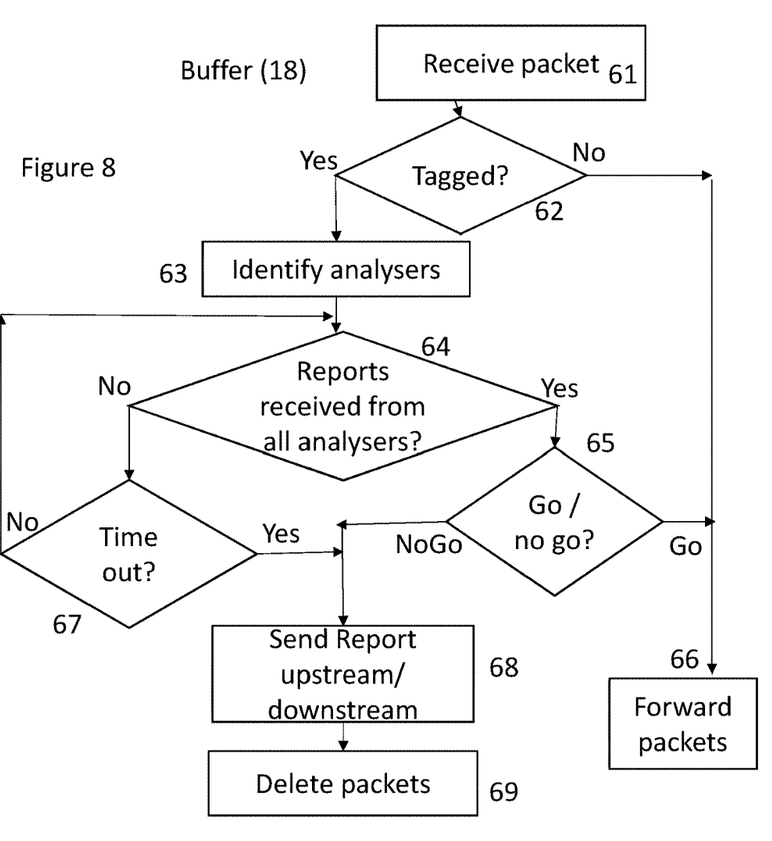
FIG. 8 depicts another flow diagram of the embodiment of FIG. 6.

In an alternative embodiment depicted in FIGS. 6, 7 and 8 individual network devices 12, 13, 14, 15, 16 dynamically advertise that they have spare local computational resource, and an allocation processor 19 associated with the receiving router 11, receiving these reports (51) assesses their capabilities and their position in the network topology (52) and allocates analysis processes to these network devices accordingly (53). It is preferable in some embodiments that the analysis processing is done close, in network topology, to the receiving gateway 1, but it can be relatively remote from the downstream gateway 4 as only reports, and not the packets themselves, are transmitted from the analysis processors to the downstream gateway 4.

In this embodiment, the selection of which of the devices 14, 15, 16 are to perform the analysis depends on what spare computational capacity each device has, any particular analytical processing that individual resources may have, and the network distance (hop distance) of each resource from the path 11, 12, 13, 17 taken by the packets. The allocation processor 19 selects a set of computational resources which are as close as possible to the local computational resources along the actual route taken by the packet, but can provide sufficient resource for the all the DPI tasks to be completed. The purpose of this design is so that the packet requires minimal duplication outside of the path that it would normally take through the network.

Where possible, the nodes 11, 12, 13, 17 forming part of the routing through the network are selected for packet analysis. If further resources 14, 15, 16 are to be used, the packets are copied by whichever point 12, 13 on the routing through the network is topologically closest to the respective analyzing resource 14, 15, 16, and forwarded for analysis by that further resource. A number of nearby computational resources 14, 15, 16 close to the path 11, 12, 13, 17 can therefore be included in the allocation of DPI-DA computational resource to the analysis of this packet.

Different suspect packets may be analyzed by different resources 14, 15, 16. Alternatively, each suspect packet may be analyzed by several resources, each performing a specific analysis task.

Referring to FIG. 7, when a packet is received by a router 11 in the DPIDA group 101 from an outside source (54), the associated analyzer 19 checks a rule knowledge bank to decide whether the packet is suspect (55). If, based on that check, it decides that the packet is suspect, it marks the packet for DPIDA (56). The marking may be done by inserting a shim of additional bits which will be recognized by the receiving router, or by setting a flag in an unused portion of the packet space. The receiving router 11 sends a copy of the flagged packets to the computational resource or resources that will do further DPI (57).

The receiving router also sends all packets, whether flagged or not, onwards on their route within the DPIDA network (57). The other routers 2, 3 in the DPIDA group forward the packets on towards the last router 7 in the DPIDA group. The routers are arranged to check, in the case of flagged packets, to ensure they are not forwarding outside the DPIDA group, and that therefore they are not the 'downstream edge router'.

Any network element 12, 13, 14, 15, 16, on receiving a flagged packet for analysis, performs deep packet analysis on its copy of the packet until it is able to issue a control instruction to the downstream edge router 17 reporting whether to release, block or delete the suspicious packet. These messages may be made over the standard network infrastructure, or a separate low latency infrastructure. Low latency control channels may be built within the same physical infrastructure of the network, but with the use of minimal buffering and shortest path algorithms for routing. Alternatively, separate infrastructure may be provisioned for low latency control channels. For example, point to point radio communications are low latency. If long wavelength radio is used, the range may be very high and high bandwidth is not usually required for control signaling.

On receiving a packet (61), if a router determines that it has a routing table rule which tells it to forward the packet outside the DPIDA group, it identifies itself as a downstream edge router 17. The operation of the downstream router 17 and associated buffer 18 will now be described with reference to FIG. 6. The 'downstream edge router' may identify itself to the analysis resources 11, 12, 13, 14, 15, 16 by requesting a control instruction for the packet.

On receiving a packet (61), if the router 17 determines that it has a routing table rule which tells it to forward the packet outside the DPIDA group, it identifies itself as a downstream edge router. If the packet is not tagged as suspicious the buffer releases the packet to a point 20 outside the cooperative group 101 (66).

If the downstream edge router detects that a packet has a shim or bits set by the DPIDA receiving router (62), it first identifies the routers from which analysis reports are required (63), using data in the tags. It then holds the packet in a buffer, unless it has already received all the control messages it requires to decide whether to delete or forward the packet (64).

Tagged packets are buffered until responses are received from all of the processors which have been selected to perform analysis on it (64), and based on these responses it decides what to do with the packet (drop it —69, or forward it to a destination beyond the DPIDA group—66). The decision process 65 may require all analyzers to give a positive message, (a simple "AND" function, so that if (and only if) all the analyzers permit release (65), the buffer releases the packet to a point 20 outside the cooperative group 101 (66). Otherwise, if the packet is not permitted for release (through a specific "fail" message or through failure to receive an approval message within a specified time (67) the packet is blocked or deleted (69). More complex decision logic may be used, for example requiring a weighted score of results from several units 14, 15, 16, to exceed a threshold value to allow forwarding.

The downstream router 17 may generate a report to the destination 20, or the source 10, or both, to notify them that a packet was blocked from transmission (68).

If the packet is cleared for release (66), the downstream edge router 17 removes any shims or flags that were used within the group to mark this packet as being subject to a DPI process and not ready for release outside the group, and forwards it to a destination 20 beyond the DPIDA group.

The invention claimed is:

1. A method of operating a telecommunications network, in which deep packet inspection is performed on one or more packets, the method comprising:
    at a receiving router:
        packets are received from a source external to the telecommunications network,
        one or more of the packets are identified as requiring deep packet inspection,
        indicating data is added to the identified packets,
        each packet is forwarded through the telecommunications network to a downstream router, with packets not requiring deep packet inspection being routed with a higher priority than packets requiring deep packet inspection, and
        one or more copies are made of each packet carrying indicating data;
    at a downstream router:
        for packets that do not have indicating data identifying the packet as requiring deep packet inspection, the downstream router forwards the packets to addresses specified in a packet header, and
        for packets having indicating data identifying the packet as requiring deep packet inspection, the downstream router stores the packets;
    at one or more deep packet inspection devices located within the telecommunications network:
        the copies are analyzed, and
        the one or more deep packet inspection devices transmit policy updates to the downstream router in response to results of the analysis, the policy updates carrying instructions on handling packets carrying the indicating data; and
    at the downstream router:
        in response to the policy update reports received from the one or more deep packet inspection devices in respect of the indicating data, the downstream router determines whether stored packets carrying the indicating data are to be forwarded to a destination external to the telecommunications network.

2. The method according to claim 1, wherein the telecommunications network comprises one or more packet caches which are capable of storing packets indexed according to respective values of the indicating data, and in response to the policy updates perform forwarding or deletion actions on the packets.

3. The method according to claim 1, wherein each router in the network has a routing table carrying instructions on forward routing of packets received over the telecommunications network, and wherein the routing instructions are dependent on the indicating data carried by the packets.

4. The method according to claim 3, wherein the downstream router and any intermediate routers on a routing path determined by the routing instructions are configurable to modify the routing table relating to packets carrying the indicating data in response to a policy update transmitted by the one or more deep packet inspection devices.

5. The method according to claim 3, wherein the routes and priorities of packets in the routing tables are adjusted according to an initial estimate of malignity of the packet.

6. The method according to claim 1, wherein packets are identified as belonging to a group, in which deep packet inspection of sample packets from the group can be used to represent all packets in the group, are allocated a common indicating data tag, sample packets are analyzed, other packets in the group are stored awaiting results of the analysis, and when the analysis of the sample packets is complete all packets having the common indicating data tag are forwarded or deleted in response to the resulting policy update.

7. The method according to claim 1, wherein each packet is transported towards the destination but not released from the downstream router until a policy update indicative that the packet is not malign is received from the deep packet inspection devices.

8. The method according to claim 7, wherein a stored packet is deleted if a report is not received relating to the packet within a predetermined time.

9. The method according to claim 1, wherein the analysis is performed by a computing resource associated with the receiving router.

10. The method according to claim 1, wherein the analysis is performed by a plurality of computing resources in the telecommunications network.

11. The method according to claim 10, wherein each packet is analyzed by a respective member of the plurality of computing resources.

12. The method according to claim 10, wherein the packets are each analyzed by the plurality of computing resources, each of the plurality of computing resources performing a respective test on the packets and transmitting a report to the downstream router.

13. The method according to claim 10, the computing resources that are to perform the analysis are selected according to available processing compatibility.

14. The method according to claim 13, wherein the computing resources are selected to be on, or as close as possible to, a path taken through the telecommunications network by the packet from the receiving router to the downstream router.

15. The method according to claim 1, wherein the reports of the results of analysis are transmitted over a communications connection separate from the connections carrying the packets.

16. The method according to claim 15, wherein a minimum-latency path is identified through the telecommunications network for transmission of the results of the analysis.

* * * * *